United States Patent
Nakagaito et al.

(10) Patent No.: US 7,207,887 B2
(45) Date of Patent: Apr. 24, 2007

(54) TORQUE FLUCTUATION ABSORBING DEVICE

(75) Inventors: Satoshi Nakagaito, Kariya (JP); Masaru Ebata, Chita (JP); Makoto Takeuchi, Obu (JP); Hiroshi Ichikawa, Nishio (JP)

(73) Assignee: Aisin Seiki Kabushiki Kaisha, Kariya-shi, Achi-ken (JP)

( * ) Notice: Subject to any disclaimer, the term of this patent is extended or adjusted under 35 U.S.C. 154(b) by 0 days.

(21) Appl. No.: 10/950,657

(22) Filed: Sep. 28, 2004

(65) Prior Publication Data
US 2005/0067249 A1    Mar. 31, 2005

(30) Foreign Application Priority Data
Sep. 29, 2003   (JP)   ............... 2003-337132
Sep. 10, 2004   (JP)   ............... 2004-264368

(51) Int. Cl.
*F16D 7/02*   (2006.01)
*F16D 3/66*   (2006.01)

(52) U.S. Cl. ........................ 464/46; 464/68.1
(58) Field of Classification Search ............... 192/55.1, 192/55.61, 56.6; 464/68.1
See application file for complete search history.

(56) References Cited

U.S. PATENT DOCUMENTS

| | | | | |
|---|---|---|---|---|
| 1,746,110 A | * | 2/1930 | Evans | ............ 188/259 |
| 3,323,328 A | * | 6/1967 | Montgomery | ............ 464/46 |
| 3,841,949 A | * | 10/1974 | Black | ............ 428/66.2 |
| 4,274,524 A | * | 6/1981 | Nakane | ............ 192/70.17 |
| 4,537,299 A | * | 8/1985 | Fukatani | ............ 192/107 C |
| 5,271,488 A | * | 12/1993 | Cooke et al. | ............ 192/107 C |
| 5,526,714 A | | 6/1996 | Schierling | |
| 5,771,999 A | | 6/1998 | Kleifges et al. | |
| 5,819,888 A | * | 10/1998 | Tamura et al. | ........ 188/218 XL |
| 6,524,681 B1 | * | 2/2003 | Seitz et al. | ................ 428/143 |
| 2002/0092715 A1 | | 7/2002 | Yabe et al. | |
| 2003/0087704 A1 | | 5/2003 | Takeuchi et al. | |

FOREIGN PATENT DOCUMENTS

| | | |
|---|---|---|
| EP | 1 462 675 A2 | 9/2004 |
| JP | 2003-194095 | 7/2003 |
| JP | 2004019834 A * | 1/2004 |

OTHER PUBLICATIONS

European Patent Office Search Report.

* cited by examiner

*Primary Examiner*—Richard M. Lorence
(74) *Attorney, Agent, or Firm*—Buchanan Ingersoll & Rooney PC

(57) ABSTRACT

A torque fluctuation absorbing device includes a first rotational member transmitted with a torque from a driving power source, a damping mechanism connected with an input shaft of a transmission, the damping mechanism having a pair of frictional members of approximately annular-shaped fixed at both surfaces of a disc, and a limiter portion for frictionally engaging the pair of frictional members with the first rotational member in a substantially direct manner or in a substantially indirect manner via a pair of frictional plates. An actual length of at least one of the pair of frictional members ranges substantially between 1 percent and 6 percents of a major diameter of the at least one of the pair of frictional members.

15 Claims, 9 Drawing Sheets

TORQUE FLUCTUATION ABSORBING DEVICE

CROSS REFERENCE TO RELATED APPLICATIONS

This application is based on and claims priority under 35 U.S.C. § 119 with respect to Japanese Patent Application 2003-337132, filed on Sep. 29, 2003, the entire content of which is incorporated herein by reference.

FIELD OF THE INVENTION

This invention generally relates to a torque fluctuation absorbing device which is disposed between a driving power source and a transmission and is able to absorb torque fluctuation caused between the driving power source and the transmission. More particularly, this invention pertains to a torque fluctuation absorbing device capable of reducing fluctuation of a limit torque value.

BACKGROUND

There have been torque fluctuation absorbing devices widely known, which are able to absorb torque fluctuation generated between a driving power source (e.g., an internal combustion engine and an electric motor) and a transmission. A conventional torque fluctuation absorbing device is provided with a damping mechanism, which is capable of absorbing fluctuation of a torque transmitted to a flywheel from the driving power source, and a limiter portion, which is capable of limiting a torque to be transmitted from the flywheel to a transmission input shaft when a fluctuating torque between the damping mechanism and the flywheel reaches a predetermined value, i.e., a limit torque value. The flywheel is connected to the driving power source, such as a crankshaft of the internal combustion engine.

The damping mechanism is connected to the transmission input shaft. The damping mechanism includes frictional members that are respectively attached at both surfaces at an outer circumferential portion of a damper disc. At the limiter portion, the frictional members of the damping mechanism is frictionally engaged with the flywheel in a direct manner or in an indirect manner via a frictional plate. The limit torque value, at which the frictional members at the limiter portion starts slipping, varies across the ages in response to the number of the operations of the limiter portion. Therefore, when the limit torque value widely increases, an excessive torque may be inputted to the transmission. On the other hand, when the limit torque value widely decreases, the frictional members may be transmitted with a torque smaller than a normal torque. In this case, a sufficient torque may not be transmitted to the transmission such that a vehicle accelerating performance may be deteriorated. Frictional powder of the frictional members seems to be one of the factors causing the above.

In light of foregoing, JP2003-194095A2 discloses a torque fluctuation absorbing device having frictional members at a limiter portion, both of which have penetrating slits in order to emit the frictional powder of the frictional members into an external ambient environment by a centrifugal force. Accordingly, the limit torque value can be effectively stabilized.

However, in the above-described torque fluctuation absorbing device, a frictional surface of each frictional member at the limiter portion can more stably and frictionally engaged with the flywheel so as to stabilize the limit torque value more reliably.

A need exists for providing an improved torque fluctuation absorbing device capable of reducing a fluctuation of a limit torque value, especially an age-based change of a limit torque value.

SUMMARY OF THE INVENTION

According to an aspect of a present invention, a torque fluctuation absorbing device includes a first rotational member transmitted with a torque from a driving power source, a damping mechanism connected with an input shaft of a transmission, the damping mechanism having a pair of frictional members of approximately annular-shaped fixed at both surfaces of a disc, and a limiter portion for frictionally engaging the pair of frictional members with the first rotational member in a substantially direct manner or in a substantially indirect manner via a pair of frictional plates. An actual length of at least one of the pair of frictional members ranges substantially between 1 percent and 6 percents of a major diameter of the at least one of the pair of frictional members.

According to another aspect of the present invention, a torque fluctuation absorbing device includes a first rotational member transmitted with a torque from a driving power source, a damping mechanism connected with an input shaft of a transmission, the damping mechanism having a pair of frictional members of approximately annular-shaped fixed at both surfaces of a disc, and a limiter portion for frictionally engaging the pair of frictional members with the first rotational member in a substantially direct manner or in a substantially indirect manner via a pair of frictional plates. At least one of the pair of frictional members includes a non-frictional portion at a rate substantially between 20 percents and 80 percents of an entire frictional surface area of the at least one of the pair of frictional members.

According to further aspect of the present invention, a torque fluctuation absorbing device includes a first rotational member transmitted with a torque from a driving power source, a damping mechanism connected with an input shaft of a transmission; the damping mechanism having a pair of frictional members of approximately annular-shaped fixed at both surfaces of a disc, and a limiter portion for frictionally engaging the pair of frictional members with the first rotational member in a substantially direct manner or in a substantially indirect manner via a pair of frictional plates. At least one of the frictional members is configured with plural frictional materials of approximately block-shaped, the at least one of the frictional members is allocated at the disc so as to range a frictional surface of the at least one of the frictional members substantially between 20 percents and 80 percents of an entire surface area of the disc at which the at least one of the frictional members can be allocated.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
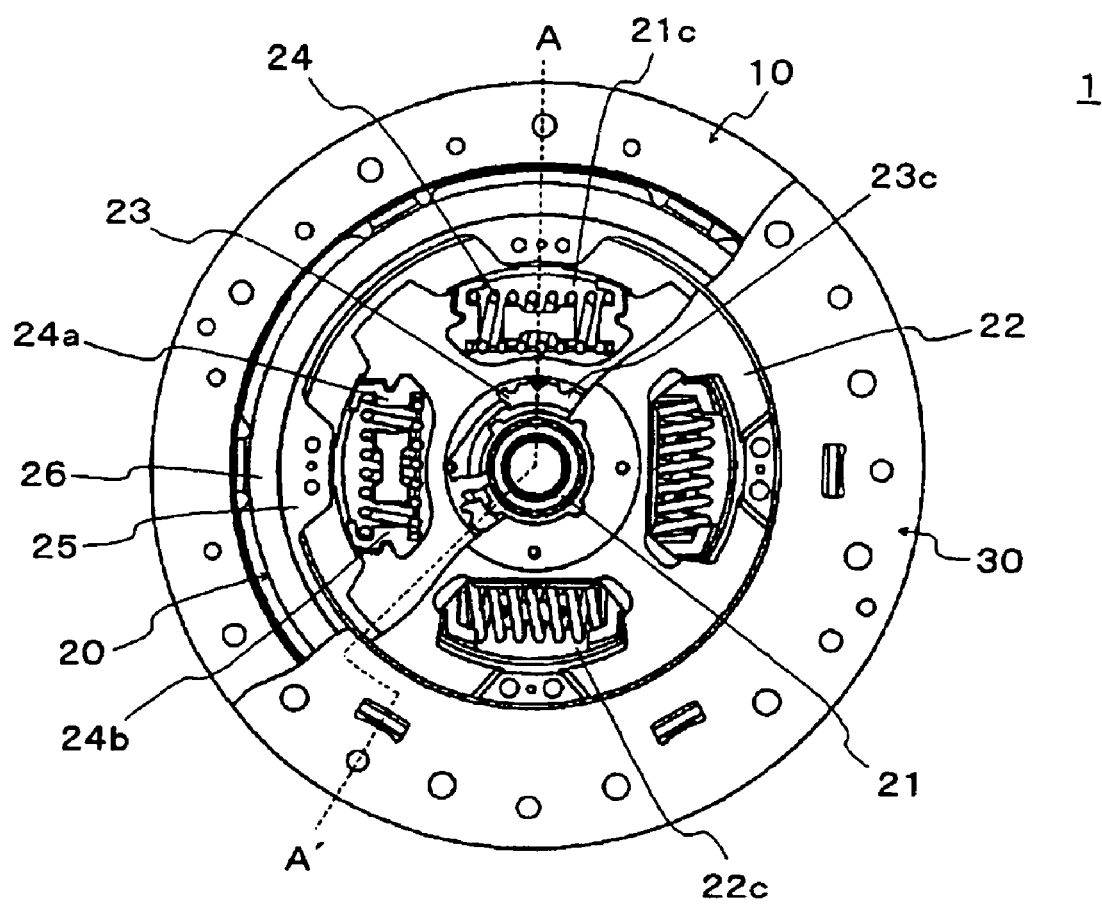
FIG. 1 is a part cutaway view illustrating a torque fluctuation absorbing device according to a first embodiment of the present invention.

Embodiments of the present invention will be described hereinbelow in detail with reference to the accompanying drawings.

As illustrated in FIGS. 1, 2, 3A and 3B, a torque fluctuation-absorbing device 1 includes a support plate 10, a damping mechanism 20 and a limiter portion 30. The support plate 10 is a first rotational member configured to transmit a driving torque from a driving power source such as an engine to the damping mechanism 20. The damping mechanism 20 is adjusted to absorb fluctuation of a driving torque at the support plate 10 connected to a crankshaft of the engine. When the fluctuating torque between the damping mechanism 20 and the support plate 10 reaches a predetermined value, i.e., a limit torque value, the limiter portion 30 limits the torque to be transmitted from the support plate 10 to a transmission input shaft.

The damping mechanism 20 includes a hub 21, a side plate 22, a thrust member 23, a damper 24, a disc 25, a pair of frictional members 26 and a rivet. The hub 21 is integrally provided with a flange portion 21a extending radially outwardly. The hub 21 is further provided with a spline portion 21b at an inner surface of a central bore thereof, which is spline engaged with the transmission input shaft. There are at least one notched portion 21c defined at a radially outer side of the flange portion 21a. According to the first embodiment of the present invention, there are four notched portions 21c defined at a radially outer side of the flange portion 21a. A pair of spring seats 24a is disposed in each notched portion 21c, and an outer peripheral surface of the spring seat 24a is positioned to be outside of a radially outer side of an outer peripheral surface of the flange portion 21a.

Figure 2:
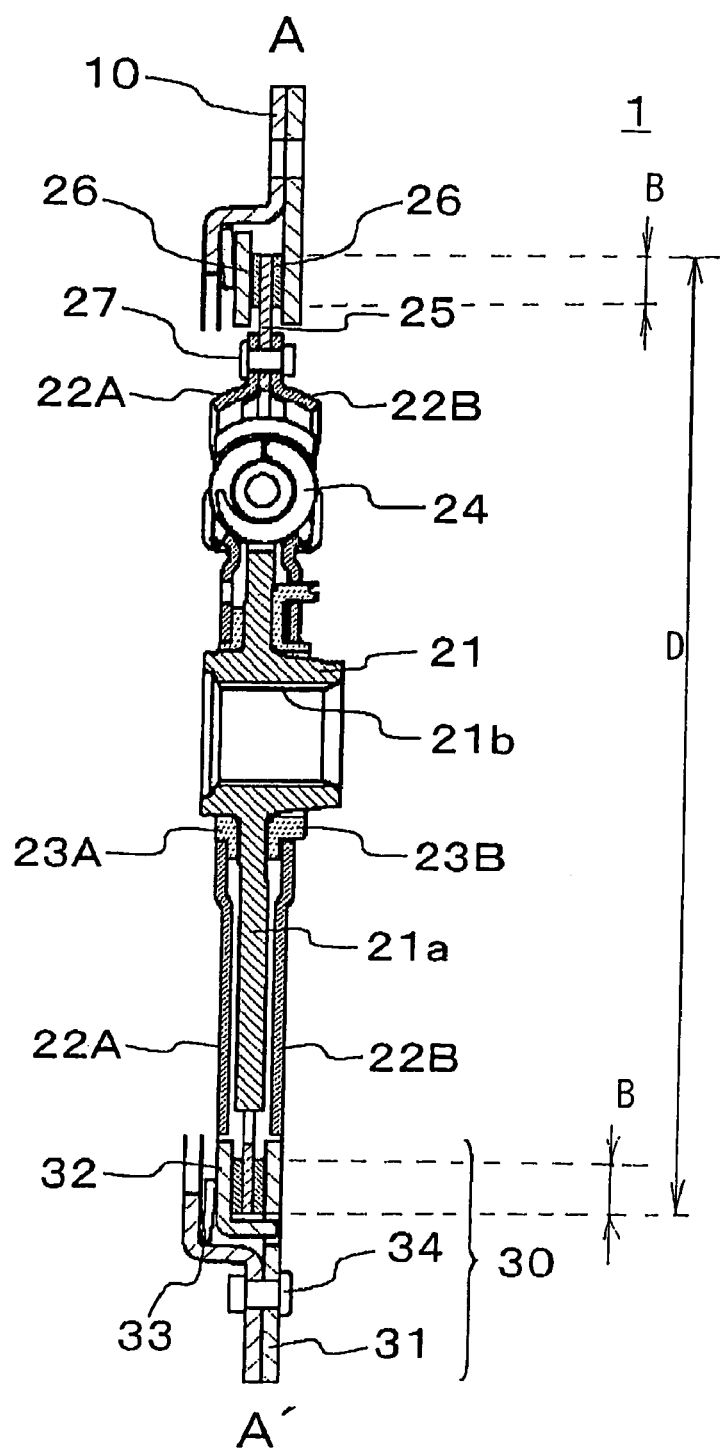
FIG. 2 is a sectional view of the torque fluctuation absorbing device taken along a line A–A' in FIG. 1.

The side plate 22 includes a first side plate 22A and a second side plate 22B. As illustrated in FIG. 2, the first and second side plates 22A and 22B are oriented along both axial surfaces of the flange portion 21a to be substantially coaxial with the hub 21, respectively. The first and second side plates 22A and 22B rotate relative to the hub 21. Each of the first and second side plates 22A and 22B has a penetrating hole at a radially outer portion thereof so as to be riveted with the disc 25 together. Each of the first and second side plates 22A and 22B has at least one window bore 22c for housing the damper 24 therein. According to the first embodiment of the present invention, there are four window bores 22c for housing the dampers 24 therein, respectively.

The thrust member 23 is an approximately ring-shaped member disposed between an inner surface of the side plate 22 and an outer surface of the hub 21. The inner surface of the side plate 22 becomes in contact with the outer surface of the hub 21. The thrust member 23 includes a first thrust member 23A, which is disposed between the outer surface of the hub 21 and the inner surface of the first side plate 22A, a second thrust member 23B, which is disposed between the outer surface of the hub 21 and the inner surface of the second side plate 22B, and a disc spring 23c (i.e., biasing means). Therefore, a hysteresis torque is generated between the flange portion 21a of the hub 21 and the side plate 22. The disc spring 23c is not limited to a disc spring.

The damper 24 includes a coil spring and is housed in the notched portion 21c of the hub 21 and the window bore 22c of the side plate 22. The notched portions 21c substantially face the window bores 22c, respectively.

The disc 25 is an approximately annular-shaped disc and extends in a more radially outward direction than an outer circumference of the side plate 22. A vicinity of an inner circumference of the disc 25 has been held by the side plate 22 and includes a penetrating hole for connecting the disc 25 with the side plate 22. The pair of frictional members 26 of approximately annular-shaped is fixed at both axial surfaces of the disc 25, as illustrated in FIG. 2. According to the first embodiment of the present invention, the pair of frictional members 26 is adhered at the both surfaces of the disc 25 with an adhesive. A frictional surface of the one frictional member 26 (illustrated at a right side in FIG. 2) is held by a first frictional surface plate 31, while a frictional surface of the other frictional member 26 (illustrated at a left side in FIG. 2) is held by a second frictional surface plate 32. In order to improve a contact performance of a frictional surface of the frictional members 26, an actual length of at least one of the frictional members 26 in a radial direction thereof ranges substantially between 1% and 6% inclusive, of a major diameter of the frictional member 26. The actual length of the frictional member 26 is indicated with an alphabetic mark B in FIG. 2. Therefore, the rate of the actual length of the frictional member 26 relative to the major diameter of the frictional member 26 can be denoted with B/D (%). It is preferable that the rate ranges substantially between 2% and 6%, inclusive. It is further preferable that the rate ranges substantially between 3% and 6%, inclusive.

Figure 3A:
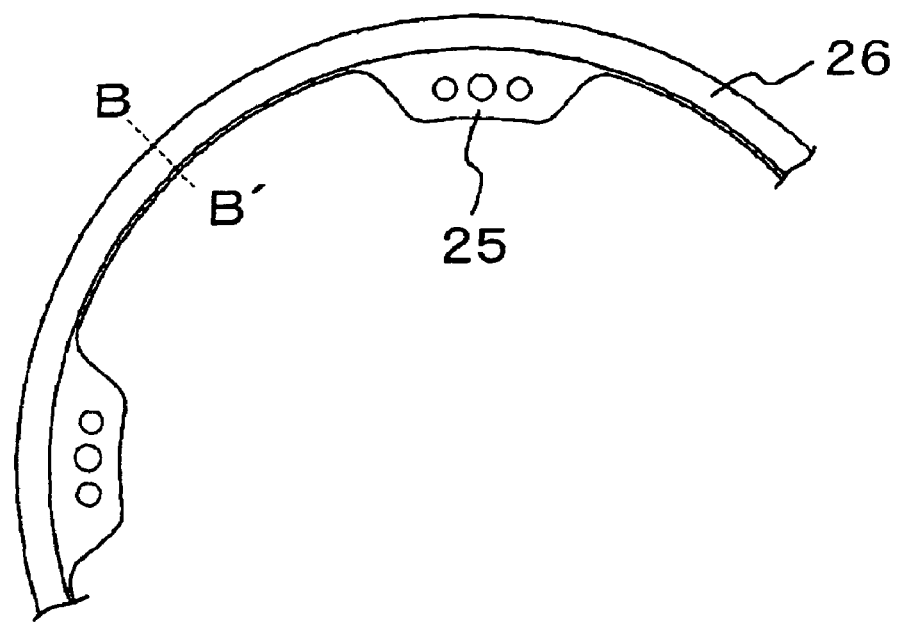
FIG. 3A is a part plan view schematically illustrating a disc and a frictional member at a limiter portion of the torque fluctuation absorbing device according to the first embodiment of the present invention.
Figure 3B:
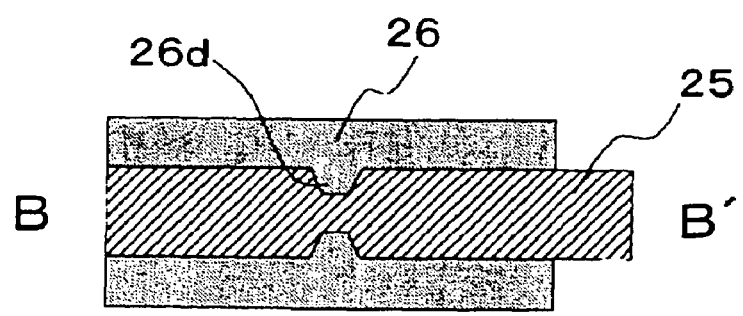
FIG. 3B is a part sectional view illustrating the disc and the frictional member at the limiter portion in FIG. 3A on a large scale.
Figure 4A:
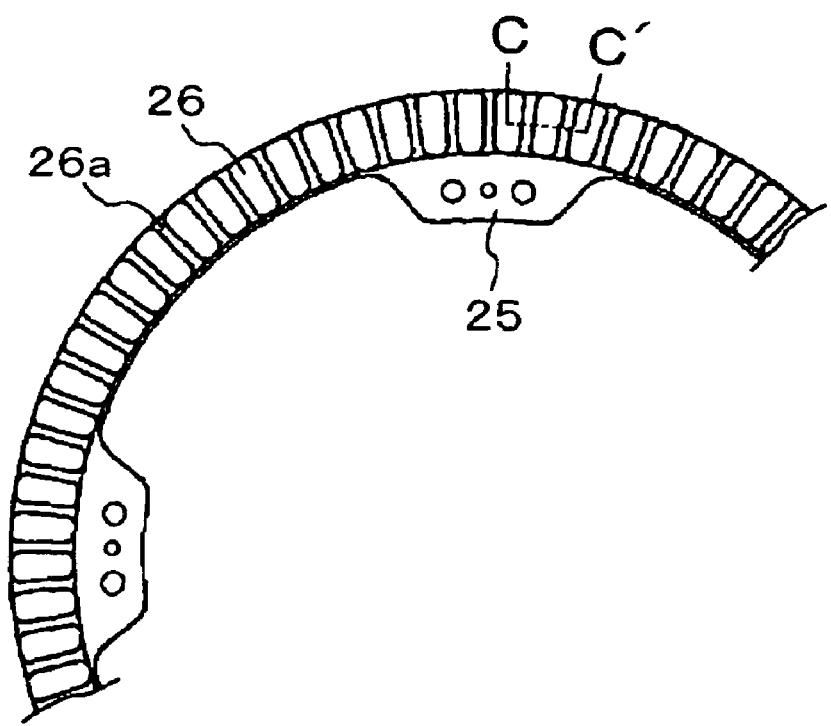
FIG. 4A is a part plan view schematically illustrating the disc and the frictional member at the limiter portion of the torque fluctuation absorbing device according to a second embodiment of the present invention.
Figure 4B:
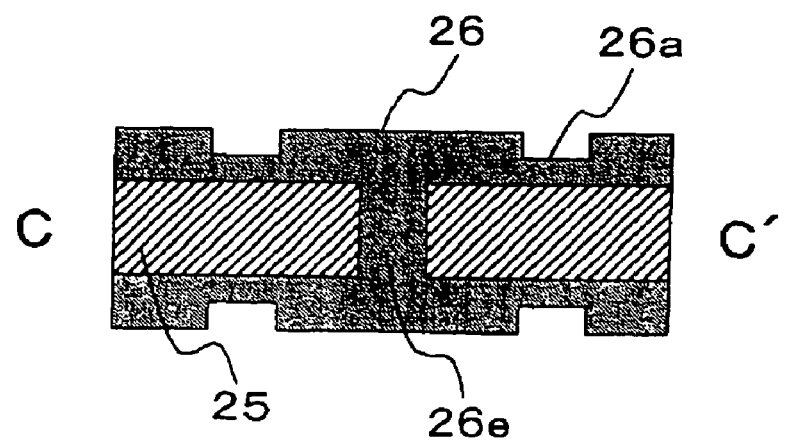
FIG. 4B is a part sectional view illustrating the disc and the frictional member at the limiter portion in FIG. 4A on a large scale.
Figure 5A:
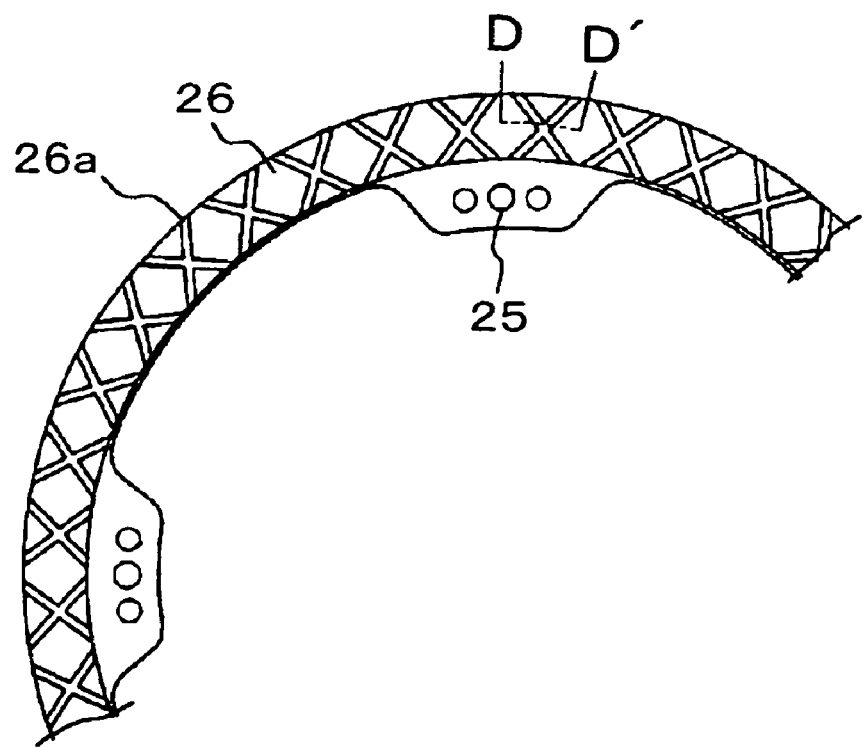
FIG. 5A is another part plan view schematically illustrating the disc and the frictional member at the limiter portion of the torque fluctuation absorbing device according to the second embodiment of the present invention.
Figure 5B:
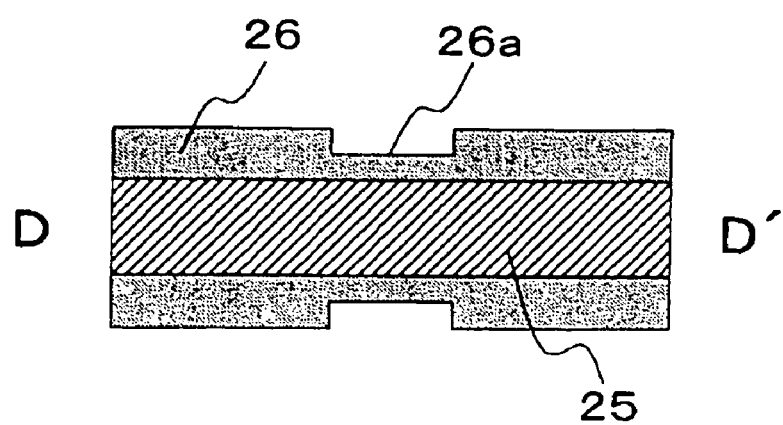
FIG. 5B is another part sectional view illustrating the disc and the frictional member at the limiter portion in FIG. 5A on a large scale.

At least one of the frictional members 26 (both of them according to the first embodiment) has at least one projected portion 26d in order to improve a fixing performance between the frictional member 26 and the disc 25, as illustrated in FIG. 3B. It is preferable that the disc 25 has a recessed portion such as a concave portion, a bore and so on, in which the projected portion 26d fits. This structure of the frictional member 26 and the disc 25 can be applied to second, third and fourth embodiments (described later). Further, the frictional member 26 can have a groove (not shown) for emitting frictional powder generated in response to the frictional engagement. The frictional powder of the frictional member 26 can be emitted into an outer ambient environment by use of a centrifugal force. The groove can be a slit communicating between a radially inner side of the frictional member 26 and a radially outer side thereof. Still further, it is preferable that the frictional member 26 is made of a material having an elastic force so as to substantially uniformly and frictionally engage the frictional surface of each frictional member 26 with the frictional surface plate.

The rivet 27 connects the disc 25 with the side plate 22.

The limiter portion 30 includes the first frictional surface plate 31, the second frictional surface plate 32, a disc spring 33 and a rivet 34. The limiter portion 30 can be interpreted to also include the frictional members 26. As illustrated in FIG. 2, the first frictional surface plate 31 is fixed at the support plate 10 via the rivet 34. The first frictional surface plate 31 is frictionally engaged with the one frictional member 26 (illustrated at the right side in FIG. 2) from a side opposite to the support plate 10. The first frictional surface plate 31 can have a hole or groove (not shown) in order to emit a frictional powder of the frictional members 26 into an outer ambient environment. The second frictional surface plate 32 is frictionally engaged with the other frictional member 26 (illustrated at the left side in FIG. 2) from a side of the support plate 10. The disc spring 33 is oriented between the support plate 10 and the second frictional surface plate 32 and biases the second frictional surface plate 32 in a right direction in FIG. 2, i.e., in a direction for keeping the second frictional surface plate 32 away from the support plate 10. Therefore, The frictional members 26 can be held by the first frictional surface plate 31 and the second frictional surface plate 32 such that the support plate 10 and the damping mechanism 20 can be maintained at a frictionally engaged condition. The rivet 34 fixes the support plate 10 and the first frictional surface plate 31.

As described above, according to the first embodiment of the present invention, the frictional members 26 are held by the first frictional surface plate 31 and the second frictional surface plate 32. Alternatively, a frictional member can be disposed between a portion of the support plate 10 and the second frictional surface plate 32. In this case, when the fluctuating torque reaches the predetermined value (i.e., limit torque value), the frictional member slips relative to the support plate 10.

Next, following explanation will be given for explaining an operation of the torque fluctuation-absorbing device 1 with the above-described structure.

When the engine is driven, the support plate 10 rotates in response to the driving force from the engine. While the fluctuating torque is smaller than the limit torque value, a rotational torque is transmitted to the disc 25 of the damping mechanism 20 and the side plate 22 via the limiter portion 30, wherein the damping mechanism 20 rotates. The rotational torque of the side plate 22 is transmitted to the hub 21 via the damper 24, the thrust member 23 and the flange portion 21a, wherein the hub 21 starts rotating. In this case, the damper 24 is elastically compressed in response to the amount of the fluctuating torque. As described above, the driving force of the diving power source is transmitted to the transmission input shaft via the damping mechanism 20.

In the torque fluctuation absorbing device 1 functioning as described above, when the floating torque between the support plate 10 and the hub 21 reaches the limit torque value in response to increase of the driving torque from the engine, the frictional members starts slipping. Therefore, a torque over the limit torque value can be prevented from being transmitted between the side plate 22 and the hub 21. A timing, at which the torque between the support plate 10 and the hub 21 reaches the limit torque value, substantially corresponds to a timing at which the torque reaches a holding torque for holding the frictional members 26 between the first frictional surface plate 31 and the second frictional surface plate 32 in a rotational direction of the frictional members 26.

Next, following explanation will be given for explaining some of the effects according to the first embodiment of the present invention with the attached drawings.

Figure 8:
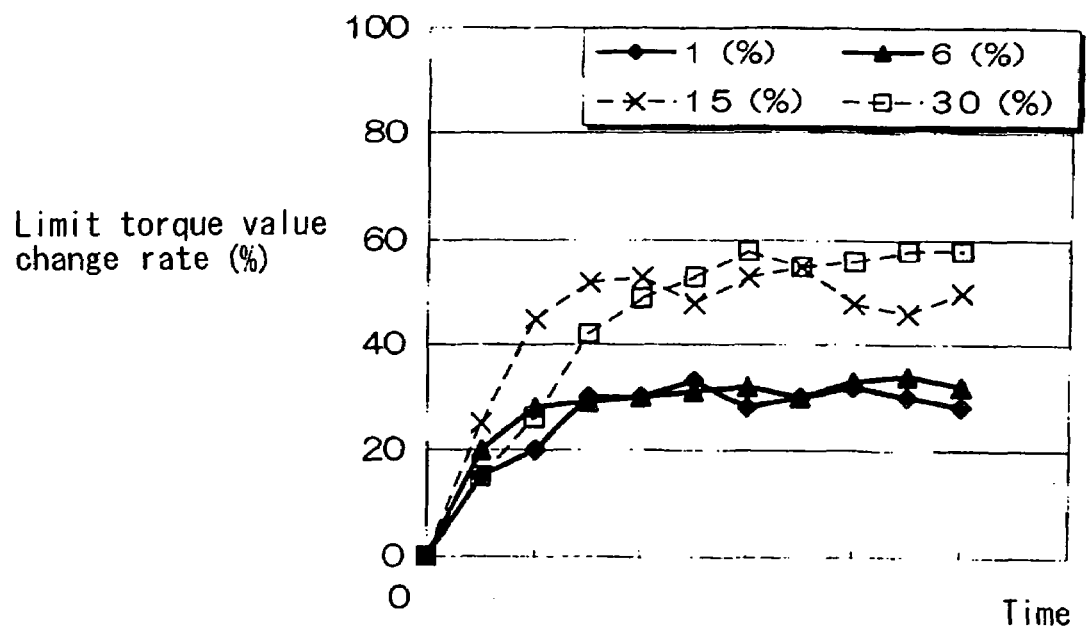
FIG. 8 is a diagram for explaining a durability test result of the torque fluctuation absorbing device according to the first embodiment of the present invention.

As testing conditions of the durability test of the torque fluctuation absorbing device 1 illustrated in FIG. 1, the torque fluctuation is inputted into the torque fluctuation absorbing device 1 at the predetermined number of times by repeatedly starting and stopping the engine activation. The y-axis of the diagram in FIG. 8 indicates a rate of an increase of the limit torque value under a condition that an initial limit torque value at the first use of this device is substantially zero percent. The x-axis thereof indicates a time transit for transmitting the torque fluctuation to this device 1 at the predetermined number of times. The predetermined number of times for transmitting the torque fluctuation to this device 1 can be determined based upon the number of torque fluctuations detected while a vehicle actually has run about 100,000 kilometers. Broken lines in FIG. 8 show the age-based changes of the limit torque values of the frictional member 26, of which actual lengths (corresponding to B/D (%) in FIG. 2) are set at 15 percents and 30 percents of the major diameter of the frictional member 26, respectively. According to the results explained by these two broken lines in FIG. 8, there is an immediate sharp increase in the limit torque value of each frictional member 26 immediately after the test starting. As time goes, each limit torque value becomes steady at an approximately 50 percents increase relative to the limit torque value at the substantially zero percent. This test result shows that an upper threshold torque to be transmitted to the transmission increases at 1½ times of the initial limit torque. Accordingly, the transmission is inputted excessive torque fluctuation such that the transmission may be subjected with a load.

On the other hand, two solid lines in FIG. 8 show the age-based changes of the limit torque values of the frictional member 26, of which actual lengths (corresponding to B/D (%) in FIG. 2) are set at 1 percent and 6 percents of the major diameter of the frictional member 26, respectively. According to the results explained by these two solid lines in FIG. 8, each limit torque value becomes steady at an approximately 30-percent increase relative to the limit torque value at the substantially zero percent. This test results shows that the age-based change (i.e., increasing rate) of the limit torque value of the frictional member 26 can be effectively restrained.

Figure 9:
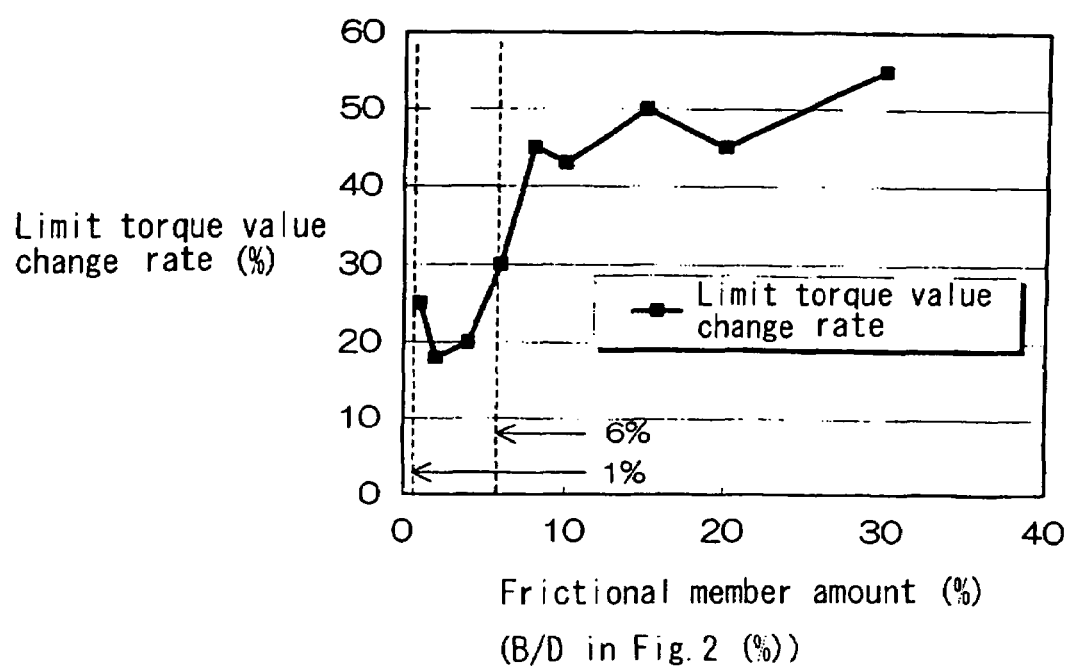
FIG. 9 is a diagram for explaining an age-based change of a limit torque value (corresponding to B/D (%) in FIG. 2) of the frictional member with respect to each actual length.

FIG. 9 is a diagram for explaining an age-based change of the limit torque value (corresponding to B/D (%) in FIG. 2)

of the frictional member 26 with respect each actual length. FIG. 9 shows a stabled increasing rate of the frictional member 26 having each actual length indicated by the x-axis in the diagram. As illustrated in FIG. 8, the stabled increasing rate is detected by inputting the torque fluctuation at the predetermined number of times. As explained in FIG. 9, the limit torque value is increased at a rate of less than 30 percents relative to the initial limit torque value when the actual length of the frictional member 26 ranged between 1 percent and 6 percents, inclusive. However, once the actual length of the frictional member 26 exceeds 10 percents of the major diameter of the frictional member 26, the limit torque value is increased more than 50 percents of the initial limit torque value.

As described above, according to the first embodiment of the present invention, it is preferable that the radial actual length of the frictional member 26 ranges substantially between 1 percent and 6 percents of the major diameter of the frictional member 26, in order to improve a contact performance of the frictional members 26.

Next, the following explanation will be given for explaining a second embodiment of the present invention with reference to FIGS. 4A, 4B, 5A and 5B.

In the torque fluctuation absorbing device 1 according to the second embodiment of the present invention, there is a difference in a structure of the frictional members 26 fixed at the disc 25 from the one according to the first embodiment of the present invention. The other components of the torque fluctuation absorbing device 1 according to the second embodiment of the present invention possess the same construction as the ones according to the first embodiment and so a detailed description thereof will be omitted hereinbelow.

In order to improve the contact performance of each frictional member 26, at least one of the frictional members 26 has a non-frictional portion (i.e., groove 26a) ranging substantially between 20 percents and 80 percents of an entire frictional surface area of the at least one of the frictional members 26. It is preferable that the frictional member 26 is designed to have the non-frictional portion ranges substantially between 30 percents and 70 percents of the entire frictional surface area of the frictional member 26. It is more preferable that the non-frictional portion ranges substantially between 40 percents and 60 percents thereof. The non-frictional portion can be a recessed portion such as a concave portion, a groove and so on as non-limiting examples. Further, it is preferable that the non-frictional portion such as the groove 26a communicates between the inner peripheral side of the frictional member 26 and the outer peripheral thereof so as to emit the frictional powder of the frictional members 26 into the outer ambient environment by use of the centrifugal force. According to the second embodiment of the present invention, the pair of frictional members 26 is adhered at the both surfaces of the disc 25 with the adhesive. In order to increase the adhesive force between the disc 25 and the frictional members 26, the disc 25 can preferably have an axially penetrating hole. The pair of frictional members 26 is provided with a bridging portion 26e for integrally connecting the frictional members 26 through the penetrating hole. This structure can be applied to the first, third and fourth embodiments. It is preferable that the fictional members 26 are made of a material having an elastic force so as to substantially uniformly and frictionally engage the frictional surface of each frictional members 26 with the frictional surface plate.

Next, following explanation will be given for explaining some of the effects according to a second embodiment of the present invention with the attached drawings.

Figure 10:
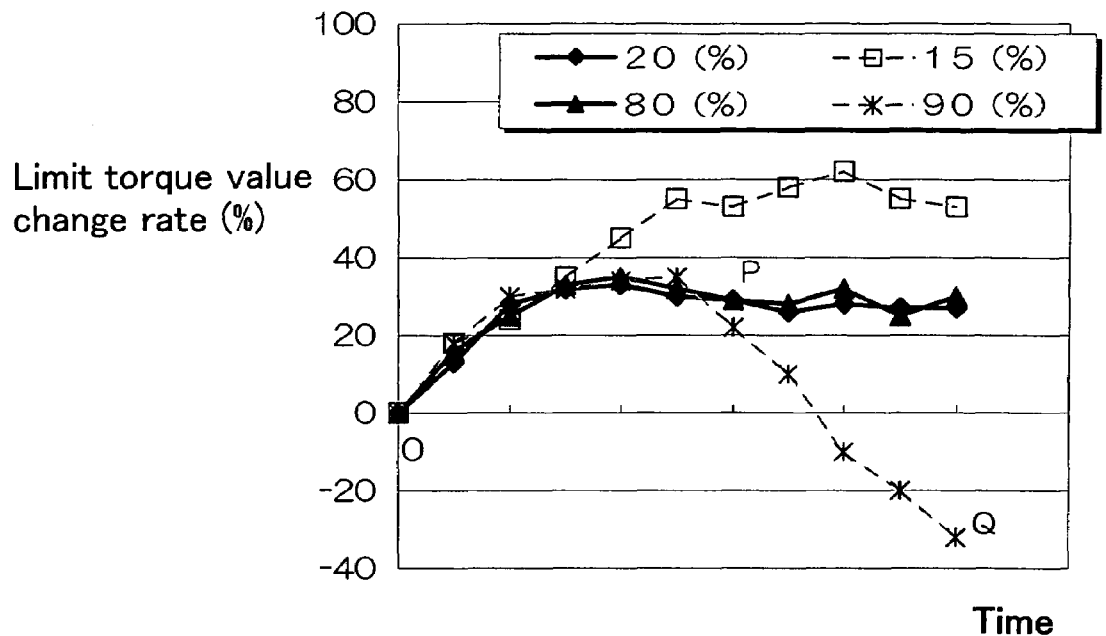
FIG. 10 is a diagram for explaining a durability test result of a torque fluctuation absorbing device according to the second embodiment of the present invention.

As testing conditions of the durability test of the torque fluctuation absorbing device 1 illustrated in 1, the torque fluctuation is inputted into the torque fluctuation absorbing device 1 at the predetermined number of times by repeatedly starting and stopping the engine activation. The y-axis of the diagram in FIG. 10 indicates a rate of an increase of the limit torque value under a condition that an initial limit torque value at the first use of this device is substantially zero percent. The x-axis thereof indicates a time transit for transmitting the torque fluctuation to this device 1 at the predetermined number of times. The predetermined number of times for transmitting the torque fluctuation to this device 1 can be determined based upon the number of torque fluctuations detected while a vehicle actually has run about 100,000 kilometers. Broken lines in FIG. 10 show the age-based changes of the limit torque values of the frictional member 26 of which groove 26a is set at 15 percents and 90 percents of the entire frictional surface area of the frictional member 26, respectively. According to the results explained by these two broken lines in FIG. 10, there is an immediate sharp increase in the limit torque value of the frictional member 26, of which groove 26a is set at 15 percents. As time goes, the increasing rate of the limit torque value of the frictional member 26 remains around 60 percents. Meanwhile, there is a 30-percent increase in the limit torque value of the frictional member 26, of which groove 26a is set at 90 percents, as time goes. (P shown in FIG. 10) The change rate of the limit torque value then falls right down. (Q shown in FIG. 10) This rapid drop implies a rapid wear-out of the frictional member 26 due to few frictional area of the frictional member 26 under a condition that the groove 26a is set at 90 percents of the entire frictional surface area of the frictional member 26.

On the other hand, two solid lines in FIG. 10 show the age-based changes of the limit torque values of the frictional member 26 of which groove 26a is set at 20 percents and 80 percents of the entire frictional surface area of the frictional member 26, respectively. According to the results explained by these two solid lines in FIG. 10, each limit torque value becomes steady at an approximately 30-percent increase relative to the limit torque value at the substantially zero percent. This test results show that the age-based change (i.e., increasing rate) of the limit torque value of the frictional member 26 can be effectively restrained.

Figure 11:
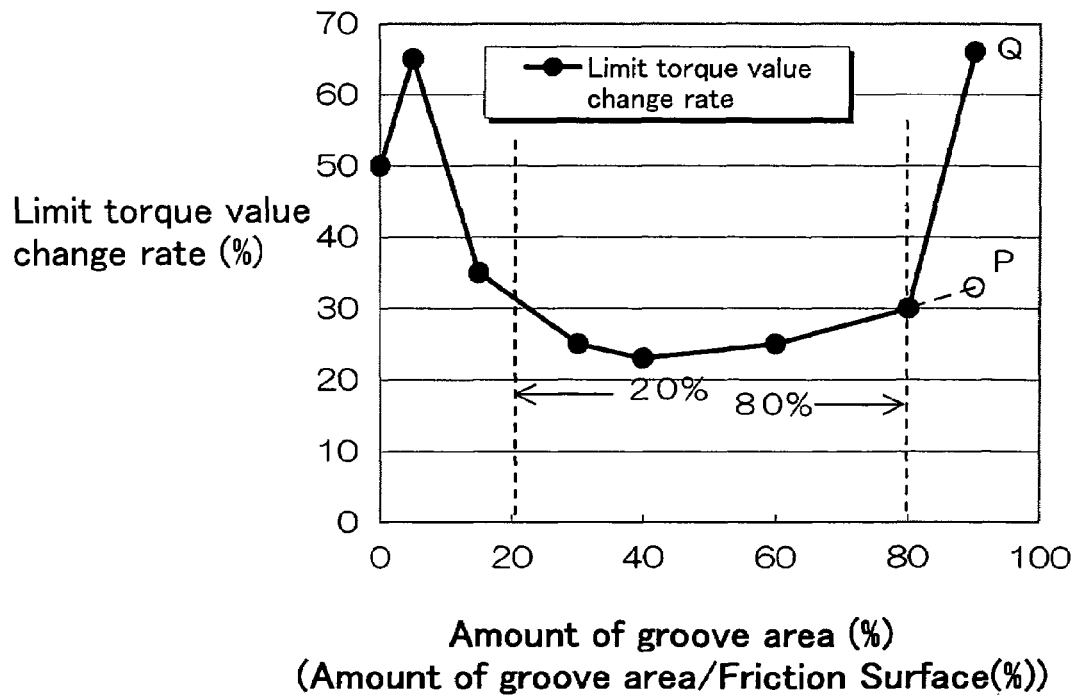
FIG. 11 is a diagram for explaining an age-based change of a limit torque value of the frictional member with respect to each area of the groove.

FIG. 11 is a diagram for explaining an age-based change of the limit torque value of the frictional member 26 with respect each rate of the groove area. FIG. 11 shows a stabled increasing rate of the frictional member 26 having each actual groove area rate (amount) indicated by the x-axis in the diagram. As illustrated in FIG. 10, the stabled increasing rate is detected by inputting the torque fluctuation at the predetermined number of times. As explained in FIG. 11, when the area of the groove 26a ranges substantially between 20 percents and 80 percents of an entire frictional surface area of each frictional member 26, the change rate of the limit torque value is effectively restrained at an approximately 30 percents. This test results show that the limit torque value can be stabilized because the frictional powder of the frictional member 26 can be effectively emitted through the groove 26a. Therefore, the limit torque value can be effectively stabilized. Also, P,Q in FIG. 11 are corresponding to P,Q in FIG. 10 especially the value of Q shows the value of difference between the maximum and minimum of the limit torque value of the frictional member 26, of which groove 26a is set at 90 percents.

Figure 6A:
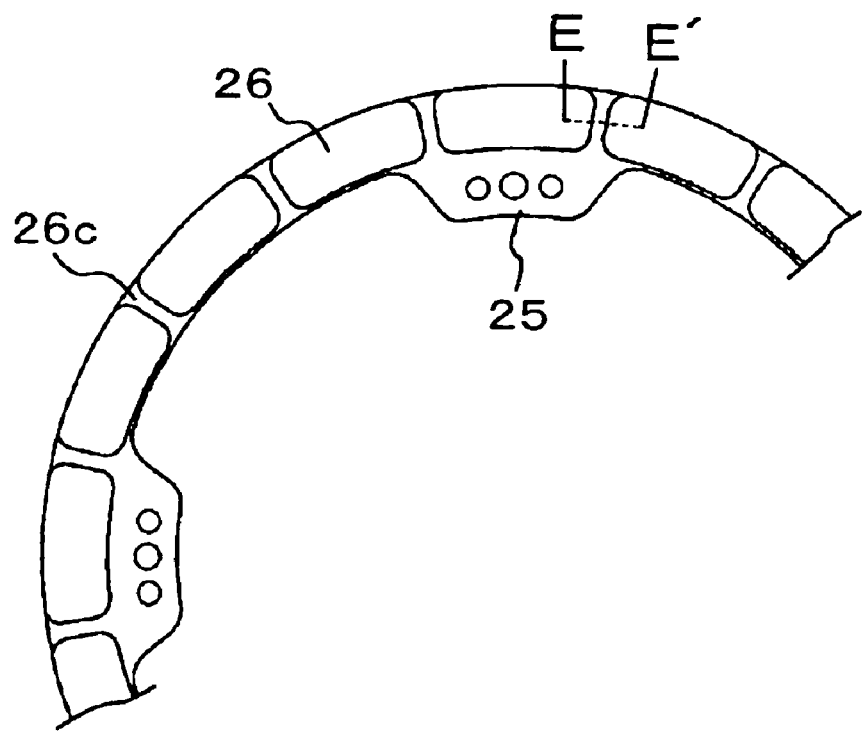
FIG. 6A is a part plan view schematically illustrating the disc and the frictional member at the limiter portion of the torque fluctuation absorbing device according to a third embodiment of the present invention.
Figure 6B:
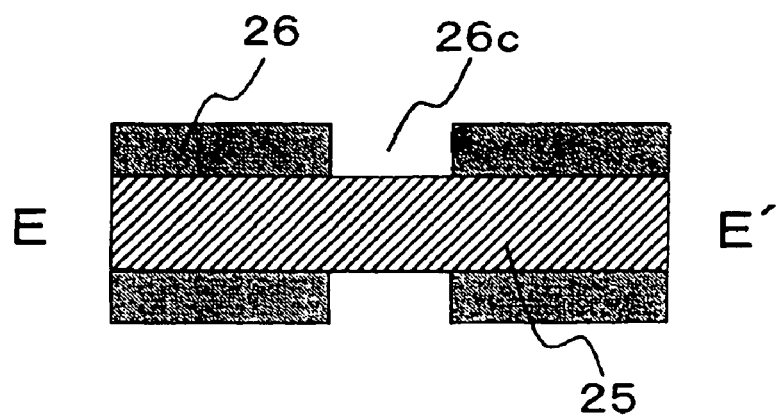
FIG. 6B is a part sectional view illustrating the disc and the frictional member at the limiter portion in FIG. 6A on a large scale.

Next, the following explanation will be given for explaining a third embodiment of the present invention with reference to FIGS. 6A and 6B.

In the torque fluctuation absorbing device 1 according to the third embodiment of the present invention, there is a difference in a structure of the frictional member 26 fixed at the disc 25 from the one according to the first embodiment of the present invention. The other components of the torque fluctuation absorbing device 1 according to the third embodiment of the present invention possess the same construction as the ones according to the first embodiment of and so a detailed description thereof will be omitted hereinbelow.

In order to improve the contact performance of each frictional member 26, at least one of the frictional members 26 is configured with plural block-shaped frictional materials. The frictional member 26 is allocated at the disc 25 so as to set a frictional surface of the frictional member 26 substantially between 20 percents and 80 percents of an entire surface area of the disc 25, at which the frictional member 26 can be allocated. It is preferable that the area of the plural block-shaped materials ranges substantially between 30 percents and 70 percents of the entire surface area of the disc 25. It is more preferable that the area of the plural block-shaped materials ranges substantially between 40 percents and 60 percents of the entire surface area thereof. There is a blank portion 26c between the adjacent block-shaped materials of each frictional member 26. Hereinafter, an area, at which the frictional member 26 can be allocated at the disc 25, substantially corresponds to an area excluding an area, which can come in contact with the side plate 22, when the disc 25 is riveted with the side plate 22.

An area, at which the frictional member 26 has not been allocated in the area at which the frictional member 26 can be allocated, can preferably communicate between the inner peripheral side and the outer peripheral side in order to emit the frictional powder of the frictional members 26 into the external ambient environment by use of the centrifugal force. Although not being illustrated, in order to improve the contact performance of the block-shaped materials 26, it is preferable that a non-frictional portion is defined at the frictional surface thereof. The non-frictional portion can be substantially the same as the groove 26a in FIG. 4. The non-frictional portion can be a recessed portion such as a groove, a concave portion and so on as non-limiting examples. Further, it is preferable that the non-frictional portion such as the groove communicates between the inner peripheral side and the outer peripheral side of the frictional member 26 so as to emit the frictional powder of the frictional members 26 into the outer ambient environment by use of the centrifugal force. According to the third embodiment of the present invention, the pair of frictional members 26 is adhered at the both surfaces of the disc 25 with the adhesive. In order to increase the adhesive force between the disc 25 and the frictional members 25, at least one of the frictional members 26 has at least one projected portion in the same manner as the projected portion 26d illustrated in FIG. 3. It is preferable that the disc 25 has a recessed portion such as a concave portion or a bore, in which the projected portion fits. It is further preferable that the pair of frictional members 26 is provided with a bridging portion (similar to the bridging portion 26e in FIG. 4) for integrally connecting the frictional members 26 through a penetrating hole at the disc 25. It is still further preferable that the frictional member 26 is made of a material having an elastic force so as to substantially equalize a contact performance of the frictional surface of each frictional member 26.

Some of the effects according to the third embodiment of the present invention is substantially the same as the effects according to the second embodiment.

Figure 7A:
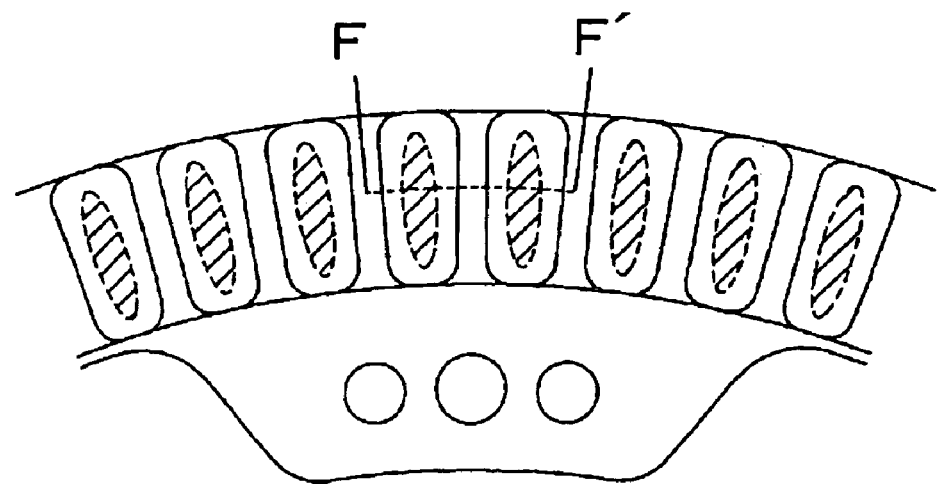
FIG. 7A is a part plan view schematically illustrating the disc and the frictional member at the limiter portion of the torque fluctuation absorbing device according to a fourth embodiment of the present invention.
Figure 7B:
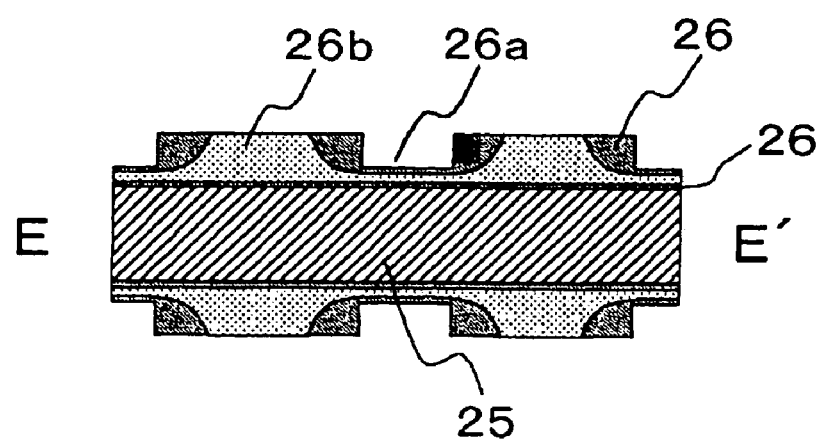
FIG. 7B is a part sectional view illustrating the disc and the frictional member at the limiter portion in FIG. 7B on a large scale.

Next, the following explanation will be given for explaining a fourth embodiment of the present invention with reference to FIGS. 7A and 7B.

The torque fluctuation absorbing device 1 according to the fourth embodiment of the present invention is provided with a reinforcing member 26b. The reinforcing member 26b can be integral with at least one of the frictional members 26 according to the first, second and third embodiments of the present invention. The reinforcing member 26b possesses a stronger property than the frictional members 26. The other components of the torque fluctuation absorbing device 1 according to the fourth embodiment of the present invention possesses the same construction as the ones according to the first, second and third embodiments and so a detailed description thereof will be omitted hereinbelow. On the basis of the cross sectional view of the frictional member 26 as illustrated in FIG. 7B, the reinforcing member 26b projects at both radial ends portions of the frictional surface less than at the vicinity of a central portion of the frictional surface. In the frictional member 26 according to the second and third embodiments of the present invention, it is preferable that the reinforcing members 26b projects at both radial ends portions of the frictional surface less than at the vicinity of the central portion thereof. The reinforcing member 26b can be made of a heat-resisting fiber such as a glass fiber, a carbon fiber, a metal fiber, an asbestos, an alamido fiber and so on as non-limiting examples. Therefore, the frictional plates can be effectively prevented from being damaged by an edge of the reinforcing member 26b. A surface roughness of the corresponding frictional surface can be restrained from being changed such that the limit torque value can be stabilized.

Next, following explanation will be given for explaining a fifth embodiment of the present invention with reference to the attached drawings. The torque fluctuation absorbing device 1 according to the fifth embodiment of the present invention is different from the devices according to the first, second, third and fourth embodiments, in which a frictional surface of at least one of the frictional surface plates 31 and 32 and the frictional surface of at least one of the frictional members 26 corresponding to the at least one of the frictional surface plates 31 and 32 are roughened, for example shot peening, bonderizing process and so on. Apart from the roughened frictional surface thereof, the device 1 according to the fifth embodiment of the present invention is substantially the same as the device 1 according to the first, second, third and fourth embodiments.

As described above, according to the fifth embodiment of the present invention, the corresponding frictional surfaces of the at least one of the frictional surface plate and the frictional member can be roughened, thereby enabling to increase only an initial frictional coefficient. Therefore, if the only initial frictional coefficient, which has a characteristic of age-based increase, is increased, the change rate of the frictional coefficient is decreased such that the limit torque value can be effectively stabilized.

The principles, embodiments and modes of operation of the present invention have been described in the foregoing specification and drawings. However, the invention which is intended to be protected is not to be construed as limited to the particular embodiments disclosed. Further, the embodiments described herein are to be regarded as illustrative rather than restrictive. Plural objectives are achieved by the present invention, and yet there is usefulness in the present invention as far as one of the objectives are achieved. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A torque fluctuation absorbing device comprising:
a first rotational member which transmits a torque from a driving power source;
a damping mechanism connected with an input shaft of a transmission, the damping mechanism comprising coil springs positioned between a side plate and a hub; and
a limiter portion comprising a pair of approximately annular-shaped frictional members fixed at both surfaces of a disc connected with the side plate, the pair of frictional members constantly engaging the first rotational member in a direct manner or in an indirect manner via a pair of frictional plates by a disc spring;
wherein
the pair of frictional members are positioned at an outer side of the coil springs in a radial direction, and
at least one of the pair of frictional members includes a non-frictional portion at a rate substantially between 20 percent and 80 percent of an entire frictional surface area of the at least one of the pair of frictional members.

2. A torque fluctuation absorbing device according to claim 1, wherein the at least one of the pair of frictional members is adhered at the disc.

3. A torque fluctuation absorbing device according to claim 1, wherein the at least one of the pair of frictional members includes a projected portion, and the disc includes a recessed portion for fitting the projected portion therein.

4. A torque fluctuation absorbing device according to claim 1, wherein the disc includes a hole for integrally connecting one of the pair of frictional members fixed at a first surface of the disc with the other one of the pair of frictional members fixed at a second surface of the disc.

5. A torque fluctuation absorbing device according to claim 1, wherein at least one of the pair of frictional members includes a reinforcing member which is more rigid than the at least one of the pair of frictional members, and the reinforcing member projects at both radial end portions of the frictional surface less than at the vicinity of a central portion of the frictional surface on the basis of a cross sectional view of the frictional member.

6. A torque fluctuation absorbing device comprising:
a first rotational member which transmits a torque from a driving power source;
a damping mechanism connected with an input shaft of a transmission;
the damping mechanism having a pair of frictional members of approximately annular-shape fixed at both surfaces of a disc; and
a limiter portion for frictionally engaging the pair of frictional members with the first rotational member in a substantially direct manner or in a substantially indirect manner via a pair of frictional plates,
wherein at least one of the frictional members is configured with plural frictional materials of approximately block-shape, the at least one of the frictional members is provided at the disc so that a frictional surface of the at least one of the frictional members is substantially between 20 percent and 80 percent of an entire surface area of the disc at which the at least one of the frictional members is provided.

7. A torque fluctuation absorbing device according to claim 6, wherein an area between adjacent friction materials forming the at least one of the frictional members penetrates from an inner peripheral side of the at least one of the frictional members to an outer peripheral side of the at least one of the frictional members.

8. A torque fluctuation absorbing device according to claim 7, wherein the at least one of the pair of frictional members of approximately block-shape has a non-frictional portion at the frictional surface of the at least one of the pair of frictional members of approximately block-shape.

9. A torque fluctuation absorbing device according to claim 8, wherein the non-frictional portion at the frictional surface of the at least one of the pair of frictional members of approximately block-shape penetrates from the inner peripheral side of the at least one of the pair of frictional members to the outer peripheral side thereof.

10. A torque fluctuation absorbing device according to claim 6, wherein the at least one of the pair of frictional members of approximately block-shape has a non-frictional portion at the frictional surface of the at least one of the pair of frictional members.

11. A torque fluctuation absorbing device according to claim 10, wherein the non-frictional portion at the frictional surface of the at least one of the pair of frictional members of approximately block-shape penetrates from an inner peripheral side of the at least one of the pair of frictional members to an outer peripheral side thereof.

12. A torque fluctuation absorbing device according to claim 6, wherein the at least one of the pair of frictional members is adhered at the disc.

13. A torque fluctuation absorbing device according to claim 6, wherein the at least one of the pair of frictional members includes a projected portion, and the disc includes a recessed portion for fitting the projected portion therein.

14. A torque fluctuation absorbing device according to claim 6, wherein the disc includes a hole for integrally connecting one of the pair of frictional members fixed at a first surface of the disc with the other one of the pair of frictional members fixed at a second surface of the disc.

15. A torque fluctuation absorbing device according to claim 6, wherein at least one of the pair of frictional members includes a reinforcing member which is more rigid than the at least one of the pair of frictional members, and the reinforcing member projects at both radial end portions of the frictional surface less than at the vicinity of a central portion of the frictional surface on the basis of a cross sectional view of the frictional member.

* * * * *